US012794142B2

(12) United States Patent
Matitsine et al.

(10) Patent No.: US 12,794,142 B2
(45) Date of Patent: *Nov. 10, 2026

(54) LENSED BASE STATION ANTENNAS

(71) Applicants: Matsing Pte Ltd., Singapore (SG); Outdoor Wireless Networks LLC, Claremont, NC (US)

(72) Inventors: Serguei Matitsine, Dallas, TX (US); Igor E. Timofeev, Dallas, TX (US); Kevin E. Linehan, Rowlett, TX (US)

(73) Assignees: Matsing Pte Ltd., Singapore (SG); Outdoor Wireless Networks LLC, Claremont, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/371,315

(22) Filed: Sep. 21, 2023

(65) Prior Publication Data

US 2024/0014569 A1 Jan. 11, 2024

Related U.S. Application Data

(63) Continuation of application No. 17/144,212, filed on Jan. 8, 2021, now Pat. No. 11,799,209, which is a (Continued)

(51) Int. Cl.

*H01Q 19/06* (2006.01)
*H01Q 1/24* (2006.01)
(Continued)

(52) U.S. Cl.

CPC ............ *H01Q 19/062* (2013.01); *H01Q 1/24* (2013.01); *H01Q 1/246* (2013.01); *H01Q 1/42* (2013.01);
(Continued)

(58) Field of Classification Search

CPC ........ H01Q 19/062; H01Q 1/246; H01Q 1/42; H01Q 15/08; H01Q 21/062; H01Q 21/24;
(Continued)

(56) References Cited

U.S. PATENT DOCUMENTS 3,781,900 A 12/1973 Fuller et al.
6,067,053 A 5/2000 Runyon et al.
(Continued)

FOREIGN PATENT DOCUMENTS

CN 1303528 8/2006
CN 201430217 Y 3/2010
(Continued)

OTHER PUBLICATIONS

Chinese Office Action (with English translation) corresponding to Chinese Application No. 201910509251.5, mailing date: Oct. 23, 2020, 31 pages.
(Continued)

*Primary Examiner* — Hai V Tran
(74) *Attorney, Agent, or Firm* — Fish IP Law, LLP

(57) ABSTRACT

A lensed antenna system is provided. The lensed antenna system include a first column of radiating elements having a first longitudinal axis and a first azimuth single, and, optionally, a second column of radiating elements having a second longitudinal axis and a second azimuth angle, and a radio frequency lens. The radio frequency lens has a third longitudinal axis. The radio frequency lens is disposed such that the longitudinal axes of the first and second columns of radiating elements are aligned with the longitudinal axis of the radio frequency lens, and such that the azimuth angels of the beams produced by the columns of radiating elements are directed at the radio frequency lens. The multiple beam antenna system further includes a radome housing the columns of radiating elements and the radio frequency lens.
(Continued)

There may be more or fewer than two columns of radiating elements.

39 Claims, 15 Drawing Sheets

Related U.S. Application Data continuation of application No. 15/730,883, filed on Oct. 12, 2017, now Pat. No. 10,897,089, which is a continuation of application No. 14/480,936, filed on Sep. 9, 2014, now Pat. No. 9,819,094, which is a continuation-in-part of application No. 14/244,369, filed on Apr. 3, 2014, now Pat. No. 9,780,457.

(60) Provisional application No. 61/875,491, filed on Sep. 9, 2013.

(51) Int. Cl.

| | |
|---|---|
| ***H01Q 1/42*** | (2006.01) |
| ***H01Q 15/08*** | (2006.01) |
| ***H01Q 21/06*** | (2006.01) |
| ***H01Q 21/08*** | (2006.01) |
| ***H01Q 21/24*** | (2006.01) |

(52) U.S. Cl.
CPC ............. *H01Q 15/08* (2013.01); *H01Q 19/06* (2013.01); *H01Q 21/06* (2013.01); *H01Q 21/062* (2013.01); *H01Q 21/08* (2013.01); *H01Q 21/24* (2013.01)

(58) Field of Classification Search
CPC .......... H01Q 21/08; H01Q 21/06; H01Q 1/24; H01Q 19/06
See application file for complete search history.

(56) References Cited

U.S. PATENT DOCUMENTS

| | | | | |
|---|---|---|---|---|
| 6,301,476 | B1 | 10/2001 | Monte et al. | |
| 6,313,802 | B1 | 11/2001 | Petersson | |
| 6,323,817 | B1 | 11/2001 | Ramanujam et al. | |
| 6,333,720 | B1 | 12/2001 | Goettl et al. | |
| 6,426,814 | B1 | 7/2002 | Berger et al. | |
| 6,433,936 | B1 | 8/2002 | Carpenter et al. | |
| 6,590,544 | B1 * | 7/2003 | Filipovic .............. | H01Q 19/062 343/753 |
| 6,831,615 | B2 | 12/2004 | Goettl | |
| 7,671,820 | B2 | 3/2010 | Tokoro et al. | |
| 8,134,511 | B2 | 3/2012 | Koh et al. | |
| 9,819,094 | B2 | 11/2017 | Matitsine et al. | |
| 10,468,777 | B2 | 11/2019 | Kawahata | |
| 2002/0067317 | A1 | 6/2002 | Sakurada | |
| 2003/0006941 | A1 | 1/2003 | Ebling et al. | |
| 2003/0038752 | A1 | 2/2003 | Park | |
| 2003/0090416 | A1 | 5/2003 | Howell et al. | |
| 2006/0176238 | A1 | 8/2006 | Lee | |
| 2007/0008236 | A1 | 1/2007 | Tillery et al. | |
| 2007/0195004 | A1 | 8/2007 | Rebeiz et al. | |
| 2008/0278394 | A1 | 11/2008 | Koh et al. | |
| 2009/0191952 | A1 | 7/2009 | Nagano | |
| 2009/0278759 | A1 | 11/2009 | Moon et al. | |
| 2009/0296223 | A1 | 12/2009 | Werner et al. | |
| 2009/0315794 | A1 | 12/2009 | Alamouti et al. | |
| 2010/0001915 | A1 | 1/2010 | Burns et al. | |
| 2011/0003131 | A1 * | 1/2011 | Matitsine ................. | H01B 3/47 428/300.1 |
| 2011/0175782 | A1 | 7/2011 | Choi et al. | |
| 2012/0098725 | A1 | 4/2012 | Lytle et al. | |
| 2013/0002505 | A1 | 1/2013 | Teillet et al. | |
| 2013/0082889 | A1 | 4/2013 | Le et al. | |
| 2014/0111396 | A1 | 4/2014 | Hyjazie et al. | |
| 2014/0176377 | A1 | 6/2014 | Merlet et al. | |
| 2015/0070230 | A1 | 3/2015 | Bradley et al. | |
| 2015/0091767 | A1 | 4/2015 | Matitsine et al. | |
| 2016/0087344 | A1 | 3/2016 | Artemenko et al. | |
| 2017/0054216 | A1 | 2/2017 | Shi et al. | |
| 2018/0097290 | A1 | 4/2018 | Matitsine et al. | |
| 2019/0058251 | A1 | 2/2019 | Kawahata | |
| 2019/0237874 | A1 | 8/2019 | Michaelis et al. | |

FOREIGN PATENT DOCUMENTS

| | | | |
|---|---|---|---|
| CN | 102301527 | A | 12/2011 |
| DE | 4430832 | A1 | 11/1995 |
| EP | 1098455 | | 4/2000 |
| EP | 1098455 | A2 | 5/2001 |
| JP | 4125984 | B2 | 5/2008 |
| WO | 9213373 | A1 | 8/1992 |
| WO | 9310572 | A1 | 5/1993 |
| WO | 2005096433 | A2 | 10/2005 |

OTHER PUBLICATIONS

European Office Action, corresponding to European Patent Application No. 14 767 265.3-1206, mailing date Nov. 19, 2020, 17 pages.
Chinese Office Action with translation, corresponding to Chinese Patent Application No. 201480057832.5, dated Mar. 5, 2018, (Chinese 11 pages, English translation, 17 pages).
Annex to Invitation to Pay Additional Fees, and Where Applicable, Protest Fee, Dated Nov. 28, 2014 (3 pgs. (Partial Search).
Invitation to Pay Additional Fees and, Where Applicable, Protest Fee, dated Nov. 28, 2014 (5 pgs) (Unity of Invention Opinion).
European Office Action pursuant to Rule 164(2)(b) and 94(3), corresponding to European Patent Application No. 14 767 265.3-1206, mailing date Sep. 18, 2019, 17 pages.
First Examination Report, India Patent Application No. 201627012244, mailing date Jan. 23, 2020, 6 pages.
Partial European Search Report corresponding to European Patent Application No. 14 767 265.3-1206, mailing date May 22, 2019, 7 pages.
Nan, Shen , et al., "Wide Band Width and High Gain Microstrip Antenna", Electronic Measurement Technology, vol. 30, No. 1, Jan. 31, 2007, pp. 49-51 (published in Chinese only).
"Summons to Attend Oral Proceedings for European Patent Application No. 14767265.3, dated Aug. 9, 2023, 13 pages".
European Search Report for European Patent Application No. 23202835.7, dated Dec. 2, 2024, 20 pages.
International Search Report and Written Opinion for International Application No. PCT/US2014/054814, dated Mar. 5, 2015, 23 pages.

* cited by examiner

LENSED BASE STATION ANTENNAS

This application is a continuation of co-pending U.S. Non-Provisional application Ser. No. 17/144,212, filed Jan. 8, 2021, which is a continuation of U.S. Pat. No. 10,897,089, filed Oct. 12, 2017, which is a continuation of U.S. Pat. No. 9,819,094, filed Sep. 9, 2014, which is a continuation-in-part of U.S. Pat. No. 9,780,457, filed Apr. 3, 2014, which claims the benefit of Provisional Application No. 61/875,491, filed on Sep. 9, 2013. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

BACKGROUND

The present inventions generally relate to radio communications and, more particularly, to multi-beam antennas utilized in cellular communication systems.

Cellular communication systems derive their name from the fact that areas of communication coverage are mapped into cells. Each such cell is provided with one or more antennas configured to provide two-way radio/RF communication with mobile subscribers geographically positioned within that given cell. One or more antennas may serve the cell, where multiple antennas commonly utilized are each configured to serve a sector of the cell. Typically, these plurality of sector antennas are configured on a tower, with the radiation beam(s) being generated by each antenna directed outwardly to serve the respective cell.

A common wireless communication network plan involves a base station serving three hexagonal shaped cells or sectors. This is often known as a three sector configuration. In a three sector configuration, a given base station antenna serves a 120° sector. Typically, a 65° Half Power Beamwidth (HPBW) antenna provides coverage for a 120° sector. Three of these 120° sectors provide 360° coverage. Other sectorization schemes may also be employed. For example, six, nine, and twelve sector sites have been proposed. Six sector sites may involve six directional base station antennas, each having a 33° HPBW antenna serving a 60° sector. In other proposed solutions, a single, multi-column array may be driven by a feed network to produce two or more beams from a single aperture. See, for example, U.S. Patent Pub. No. 20110205119, which is incorporated by reference.

Increasing the number of sectors increases system capacity because each antenna can service a smaller area. However, dividing a coverage area into smaller sectors has drawbacks because antennas covering narrow sectors generally have more radiating elements that are spaced wider than antennas covering wider sectors. For example, a typical 33° HPBW antenna is generally two times wider than a common 65° HPBW antenna. Thus, costs and space requirements increase as a cell is divided into a greater number of sectors.

To solve these problems, antennas have been developed using multi-beam forming networks (BFN) driving planar arrays of radiating elements, such as the Butler matrix. BFNs, however, have several potential disadvantages, including non-symmetrical beams and problems associated with port-to-port isolation, gain loss, and a narrow band. Classes of multi-beam antennas based on a classic Luneberg cylindrical lens (Henry Jasik: "Antenna Engineering Handbook", McGraw-Hill, New York, 1961, p. 15-4) have tried to address these issues. And while these lenses can have better performance, the costs of the classic Luneberg lens (a multi-layer, cylindrical lens having different dielectric in each layer) is high and the process of production is extremely complicated. Additionally, these antenna systems still suffer from several problems, including beam width stability over the wide frequency band and high cross-polarization levels. Accordingly, there is a need for an antenna system that solves these problems to provide a high performance multi-beam base station antenna at an affordable cost.

SUMMARY OF THE INVENTION

In one example of the present invention, a multiple beam antenna system is provided. The multiple beam antenna system includes a first column of radiating elements having a first longitudinal axis and a first azimuth angle, a second column of radiating elements having a second longitudinal axis and a second azimuth angle, and a radio frequency lens. The radio frequency lens has a third longitudinal axis. The radio frequency lens is disposed such that the longitudinal axes of the first and second columns of radiating elements are aligned with the longitudinal axis of the radio frequency lens, and such that the azimuth angles of the beams produced by the columns of radiating elements are directed at the radio frequency lens. One or more columns of radiating elements may be slightly tilted in elevation plane against the axis of radio frequency lens. The multiple beam antenna system further includes a radome housing the columns of radiating elements and the radio frequency lens.

There may be more or fewer than two columns of radiating elements. In one example, the multiple beam antenna system includes three columns of radiating elements. Each of the columns of radiating elements produces a beam having a −10 dB beam width of approximately 40° after passing through the radio frequency lens. The columns of radiating elements are arranged such that the beams have azimuth angles of −40°, 0°, 40°, respectively, relative to boresight of the antenna system.

In one example, the radio frequency lens is a cylinder having a diameter in the range of approximately 1.5-5 wavelengths of the nominal operating frequency of the columns of radiating elements. The radio frequency lens may be longer than the columns of radiating elements.

In another aspect of the present invention, the radio frequency lens comprises dielectric material having a substantially homogenous dielectric constant, which may be in the range of 1.5 to 2.3. The radio frequency lens may comprise a plurality of dielectric particles. In another aspect of the invention, the radiating elements are dual polarized radiating element, having dual linear +/−45° polarization.

In another aspect of the invention, the radiating elements are configure to have azimuth beam width monotonically decreasing with increasing of frequency. For example, the radiating elements may comprise a box-type dipole array. The radiating elements may further include one or more directors for stabilizing a beam formed by lensed antenna.

In another aspect of the invention, each of the columns of elements may comprise two or more arrays of radiating elements adapted to operate in different frequency bands. For example, a column of radiating elements may include high band elements and low band elements. In one example, the number of high band radiating elements is approximately twice the number of low band elements. The high band radiating elements may produce a beam having azimuth beamwidth that is narrower than a beamwidth of a beam produced by the plurality of lower band elements before passing through the radio frequency lens. This allows the beams after passing through the radio frequency lens to be of approximately equal beamwidths.

In one example, the high band radiating elements include directors to narrow the beamwidth. In another example, the high band elements are located in two lines in parallel to line of low band elements to narrow the beamwidth produced by the high band elements.

In another aspect of the invention, the multiple beam antenna system may further include a sheet of dielectric material disposed between the radio frequency lens and one or more of the columns of radiating elements. The sheet of dielectric material may further include wires disposed on the sheet of dielectric material. The sheet of dielectric material may further include slots disposed on the sheet of dielectric material. A second sheet of dielectric material may be included for improving port-to port isolation of multi-beam antenna.

In another aspect of the present invention, the multiple beam antenna system may further include a secondary radio frequency lens disposed between the columns of radiating elements and the radio frequency lens. The secondary lens may comprise a dielectric rod. Alternatively, the secondary lens may comprise dielectric blocks located at each radiating element.

The present invention is not necessarily limited to multi-beam antennas. In another example of the present invention, an antenna system may include at least one column of radiating elements having a first longitudinal axis and an azimuth angle; a radio frequency lens comprising a plurality of dielectric particles and having a second longitudinal axis, the radio frequency lens disposed such that the second longitudinal axis is substantially aligned with the first longitudinal axis and the azimuth angle is directed at the second longitudinal axis; and a radome housing the column of radiating elements and the radio frequency lens.

The plurality of dielectric particles may incorporate wires. In another example, the dielectric particles may comprise at least two types of particles uniformly distributed in the volume of the radio frequency lens. In another example, some of the dielectric particles contain left handed material.

In another aspect of the invention, the radio frequency lens (either for single beam or multi-beam antennas) may include two different kinds of dielectric material with different anisotropy. For example, one of the dielectric materials has anisotropy. In another example, the two different kinds of dielectric material comprise two different anisotropic materials. In another example, the two anisotropic materials are mixed in unequal proportions. In another example, the two anisotropic materials have different values of dielectric constant in a direction of the second longitudinal axis and an axis perpendicular to the second longitudinal axis.

In another aspect of the invention, the radio frequency lens (either for single beam or multi-beam antennas) may include a reflector covering a back area of the antenna system. The antenna may further include an absorber located between the column of radiating elements and the reflector.

DETAILED DESCRIPTION OF THE PREFERRED EMBODIMENTS

Figure 1A:
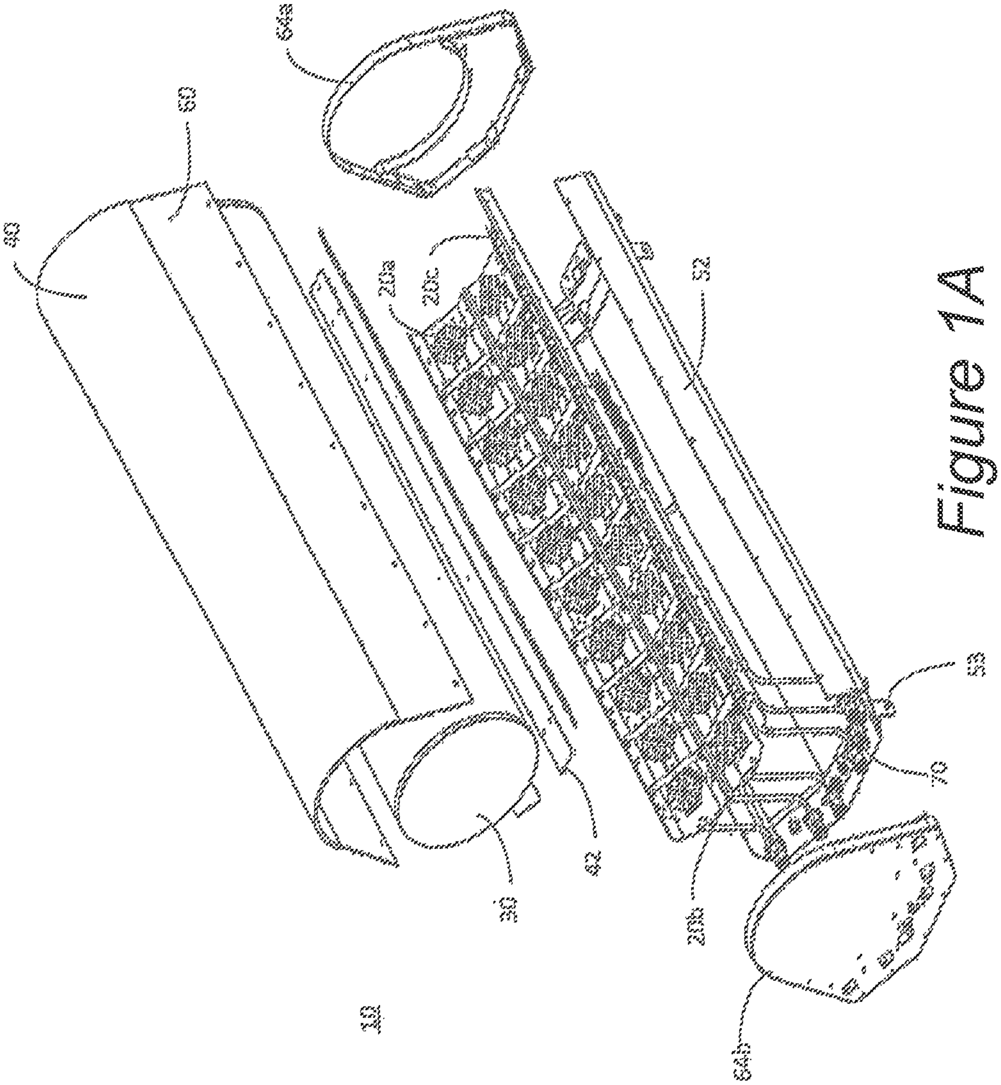
FIG. 1*a* is a diagram showing an exploded view of an exemplary lensed multi-beam base station antenna system.
Figure 1B:
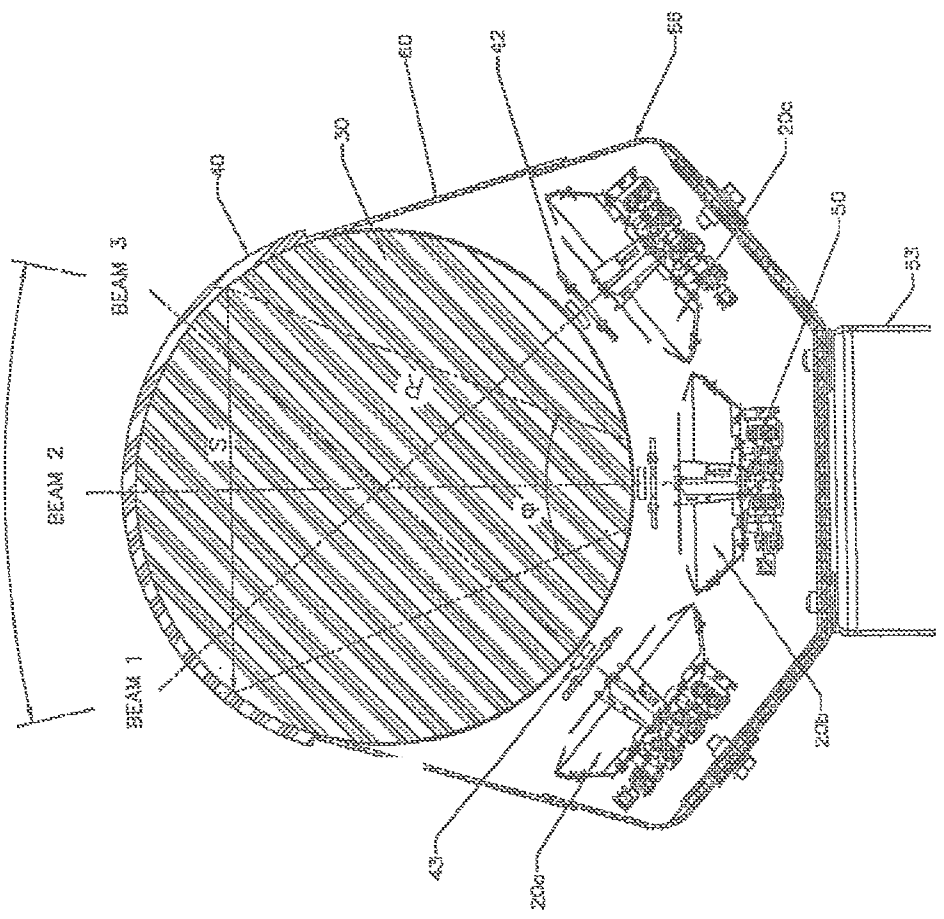
FIG. 1B is a diagram showing a cross-sectional view of an exemplary assembled lensed multi-beam base station antenna system.

Referring to the drawings, and initially to FIG. 1*a*, 1*b*, an exploded view of one embodiment of a multi-beam base station antenna system 10 is shown in FIG. 1*a*, and its cross-section is shown in FIG. 1B. In its simplest form, the multi-beam base station antenna system 10 includes one or more linear arrays of radiating elements 20*a*, 20*b*, and 20*c* (also referred to as "antenna arrays" or "arrays" herein) and a radio frequency lens 30. Arrays 20 may have approximately the same length with lens 30. The multi-beam base station antenna system 10 may also include a first compensator 40, a second compensator 42, a secondary lens 43 (shown in FIG. 1B), a reflector 52, radome 60, end caps 64*a* and 64*b*, absorber 66 and ports (RF connectors) 70. In description below, azimuth plane is orthogonal to axis of radio frequency lens 30, and elevation plane is in parallel to axis of lens 30.

In the embodiment shown in FIG. 1*a*, 1*b*, the radio frequency lens 30 focuses azimuth beams of arrays 20*a*, 20*b*, and 20*c*, changing, for example, their 3 dB beam widths from 65° to 23°. In the embodiment shown in FIG. 1*a*, 1*b*, three linear antenna arrays 20*a*, 20*b*, and 20*c* are shown, but any number and/or shape of arrays 20 may be used. The number of beams of a multi-beam base station antenna system 10 is the same as number of ports 70 of arrays 20*a*, 20*b*, and 20*c*. In FIG. 1*a*, 1*b*, each of arrays 20 has 2 ports, one for +45° and another for −45° polarization.

In operation, the lens 30 narrows the HPBW of the antennas arrays 20*a*, 20*b*, and 20*c* while increasing their gain (by 4-5 dB for 3-beam antenna shown in FIG. 1). For example, the longitudinal axes of columns of radiating elements of the antenna arrays 20*a*, 20*b*, and 20*c* can be parallel with the longitudinal axis of lens 30. In other embodiments, axis of antenna arrays 20 can be slightly tilted (2-10°) to axis of lens 30 (for example, for better return loss or port-to-port isolation tuning), but axis of an array and axis of lens are still located in the same plane. All antenna arrays 20 share the single lens 30 so each antenna array 20*a*, 20*b*, and 20*c* has their HPBW altered in the same manner.

The multi-beam base station antenna system 10 as described above may be used to increase system capacity. For example, a conventional 65° HPBW antenna could be replaced with a multi-beam base station antenna system 10 as described above. This would increase the traffic handling capacity for the base station. In another example, the multi-beam base station antenna system 10 may be employed to reduce antenna count at a tower or other mounting location.

A cross-sectional view of an assembled multi-beam base station antenna system 10 is illustrated in FIG. 1B. FIG. 1B is also illustrating how 3 beams are formed (BEAM 1, BEAM 2, BEAM 3). The azimuth position angle of the beams provided by the antenna arrays 20*a*, 20*b*, and 20*c* are shown by dotted lines in FIG. 1B. Preferably, the azimuth angle for each beam will be approximately perpendicular to the reflector of the array 20. For example, in the embodiment shown in FIG. 1B, −10 dB beamwidth of each beam is close to 40° and the directions of beams are −40°, 0°, 40°, respectively.

Figure 10:
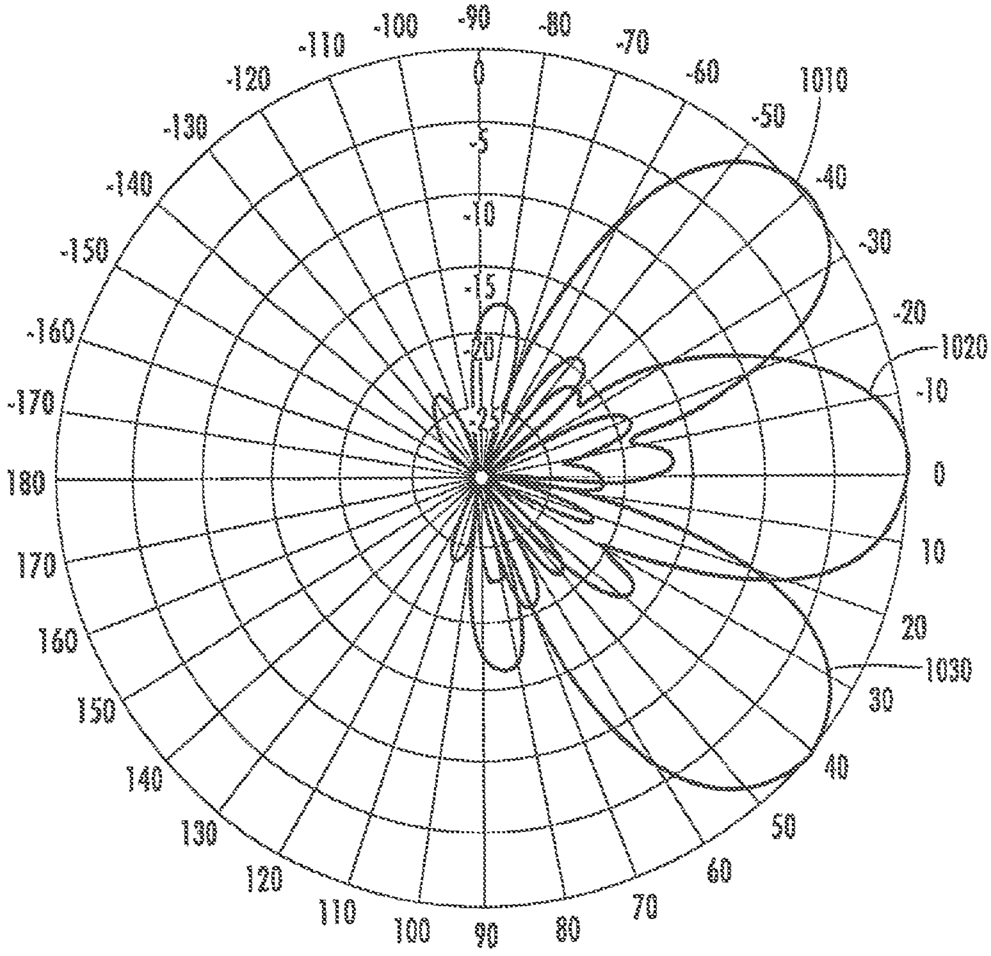
FIG. 10 is a diagram showing a measured radiation patterns in azimuth plane for all three beams of an exemplary three-beam lensed base station antenna system.
Figure 11:
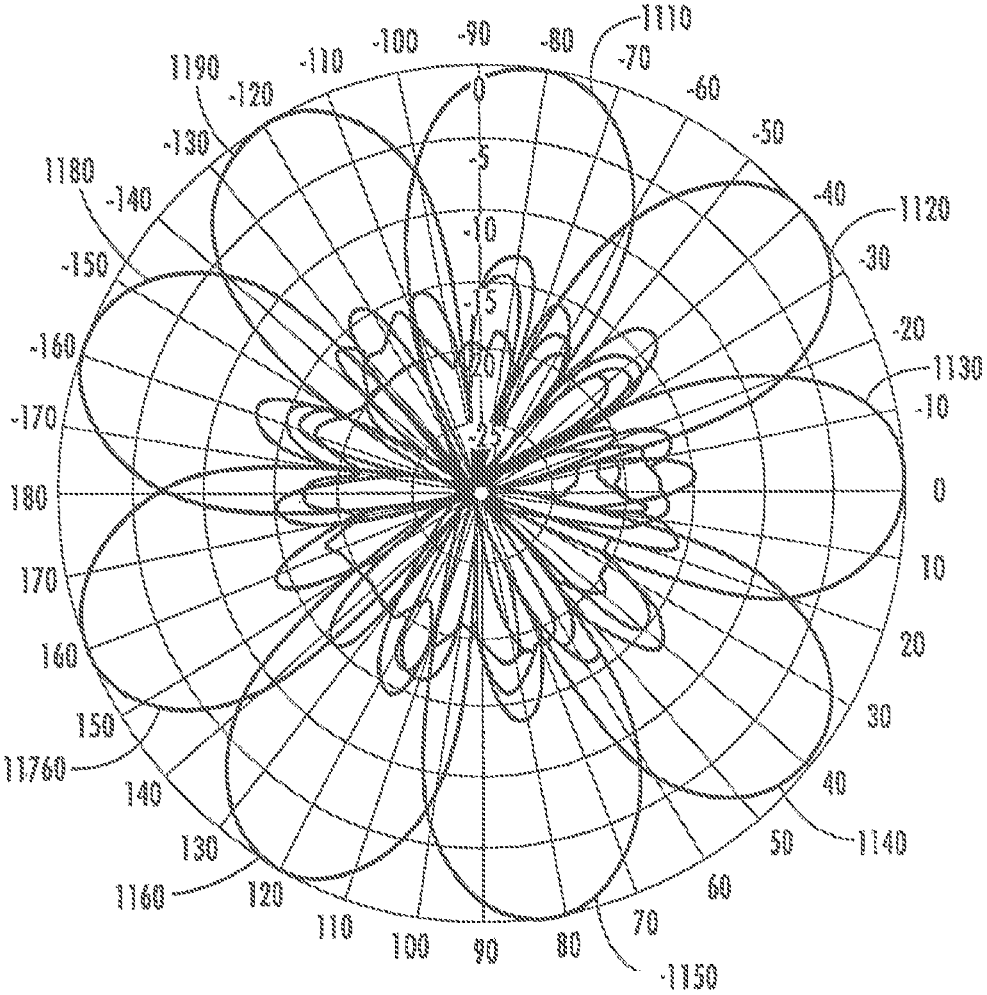
FIG. 11 is a diagram showing nine sector cell coverage by three exemplary three-beam lensed base station antenna systems.

One difference of lens 30 compared to known Luneberg lenses is its internal structure. As shown in FIG. 1B, the dielectric constant ("Dk") of lens 30 is homogenous, in the contrast with known Luneberg lenses which have multiple layers with different Dk. A lens 30 having a homogenous Dk is generally easier and less expensive to manufacture. Also, it can be more compact, having 20-30% less diameter. In one embodiment, a lens having a Dk of approximately 1.8 and diameter of about 2 wavelengths λ focuses beams and provides azimuth patterns with low sidelobes (less than −17 dB), as shown in FIGS. 10 and 11. In the case of an antenna system 10 having three beams, a lens 30 having a diameter of approximately 2 wavelengths and Dk=1.9 provides a beam width about 30% less than an equivalent prior art antenna system including a planar array based on the Butler matrix type BFN, as one can see from measured HPBW:

| Lensed Antenna | Prior Art | Narrowing coeff. | |
|---|---|---|---|
| 1.72 GHz | 25.9 | 33.3 | 29% |
| 1.8 GHz | 24.9 | 31.7 | 27% |
| 1.9 GHz | 23.3 | 30.0 | 29% |

It was also confirmed that homogeneous cylindrical lens (when diameter of lens is 1.5-5 wavelength in free space) has about 1 dB more directivity compare to multi-layer Luneberg lens with the same diameter and compare to predicted by geometric optics. Performance of dielectric cylinder in this case can be explained as combination of dielectric travelling wave antenna (end fire mode) combined with lens mode (focusing mode) of operation. The 1.5-5 wavelength diameter embodiment is applicable for forming 2 to 10 beams, which includes most of current multi-beam applications for base station antennas. Compactness is one of the key advantages of a proposed multi-beam base station antenna system; the antenna is narrower compared to known multi-beam solutions (based on Luneberg lens or Butler matrix).

A conventional Luneberg lens is a spherically symmetric lens that has a varying index of refraction inside it. Here, the lens 30 is preferably shaped as a circular cylinder (if, for example, each beam need the same shape) and is homogeneous (not multilayer) as shown in FIGS. 1*a* and 1*b*. Alternatively, or additionally, the lens 30 may comprise an elliptical cylinder, which may provide additional performance improvements (for example, the sidelobes reduction of a central beam). Other shapes may also be used.

In some embodiments, the lens 30 may comprise a structure such as the ones described in U.S. patent application Ser. No. 14/244,369, filed Apr. 3, 2014, which is hereby incorporated by reference in its entirety. As described in that application, the lens 30 may comprise various segmented compartments to provide additional mechanical strength.

The lens 30 may be made of particles or blocks of dielectric material. The dielectric material particles focus the radio-frequency energy that radiates from, and is received by, the linear antenna arrays 20*a*, 20*b*, and 20*c*. The dielectric material may be artificial dielectric of the type described in U.S. Pat. No. 8,518,537 which is incorporated by reference. In one example, the dielectric material particles comprise a plurality of randomly distributed particles. The plurality of randomly distributed particles is made of a lightweight dielectric material. The range of densities of the lightweight dielectric material can be, for example, 0.005 to 0.1 g/$cm^3$. At least one needle-like conductive fiber is embedded within each particle. By varying number/orientation of conductive fibers inside particle, Dk can be vary from 1 to 3. Where there are at least two conductive fibers embedded within each particle, the at least two conductive fibers are in an array like arrangement, i.e. having one or more row that include the conductive fibers. Preferably, the conductive fibers embedded within each particle are not in contact with one another.

Base station antennas are subject to vibration and other environmental factors. The use of compartments assists in the reduction of settling of the dielectric material particles, increasing the long term physical stability and performance of the lens 30. In addition, the dielectric material particles may be stabilized with slight compression and/or a backfill material. Different techniques may be applied to different compartments, or all compartments may be stabilized using the same technique.

Antennas with traditional Luneburg cylindrical lenses can suffer from high cross-polarization levels. The use of a isotropic (homogeneous) dielectric cylinder can also provide depolarization of the incident EM wave based on its geometry (nonsymmetrical for vertical (V) and horizontal (H) components of the electric field). When the EM wave crosses a cylinder, polarization along the axis of cylinder ("VV") will have a bigger phase delay than polarization perpendicular to cylinder axis ("HH"), causing depolarization.

This depolarization can be reduced by constructing a radio frequency lens 30 with dielectric materials having different DK for the VV and HH directions. To compensate for depolarization, the DK for VV polarization must be less than the DK for HH polarization. The difference in DK, may depend on a variety of factors including the size of cylinder and the relationship between beam wavelength and the diameter of the cylinder. In other words, reduction of the naturally occurring depolarization caused by a cylindrically shaped lens 30 can be achieved using anisotropic dielectric materials. Similarly, circular polarization can be created, if needed, on the other hand by using anisotropic material to create a difference in phase of 90°.

Anisotropic material can be, for example, the dielectric particles having conductive fibers inside described in U.S. Pat. No. 8,518,537, which is incorporated by reference. By mixing, or arranging, different particles with different compositions and/or shapes, different values of DK in direction of parallel and perpendicular to axis of cylinder can be achieved. For example, an incident wave linearly polarized with polarization+/−45° will have a cross-polarization level of about −8 dB after passing through a dielectric cylinder with a DK of 2 and a diameter of approximately two wavelengths, this level may be unacceptable for certain commercial applications where a cross-polarization level of approximately −15 dB is desired. This increased cross-polarization is occurring because the VV component of the electric field has a phase difference of about −30° compare to the HH component and the elliptical polarization is created with an axial ratio of about 8 dB. Artificial dielectric particles based on conductive fibers such as those described in U.S. Pat. No. 8,518,537, which is hereby incorporated by reference in its entirety, have a +20° phase difference between H and V field components (i.e. a phase difference in the opposite direction). By mixing regular dielectric with artificial dielectric, phase differences between VV and HH components can be obtained close to 0° and antenna cross-polarization can be minimized (see FIG. 10) and Spec<−15 dB can be met in wide frequency band, say 1.7-2.7 GHz. In one embodiment, a mix of approximately 40% regular dielectric and 60% artificial dielectrics (called also in literature left handed material for its unusual characteristic) are used. Other ratios also may be used.

Figure 2:
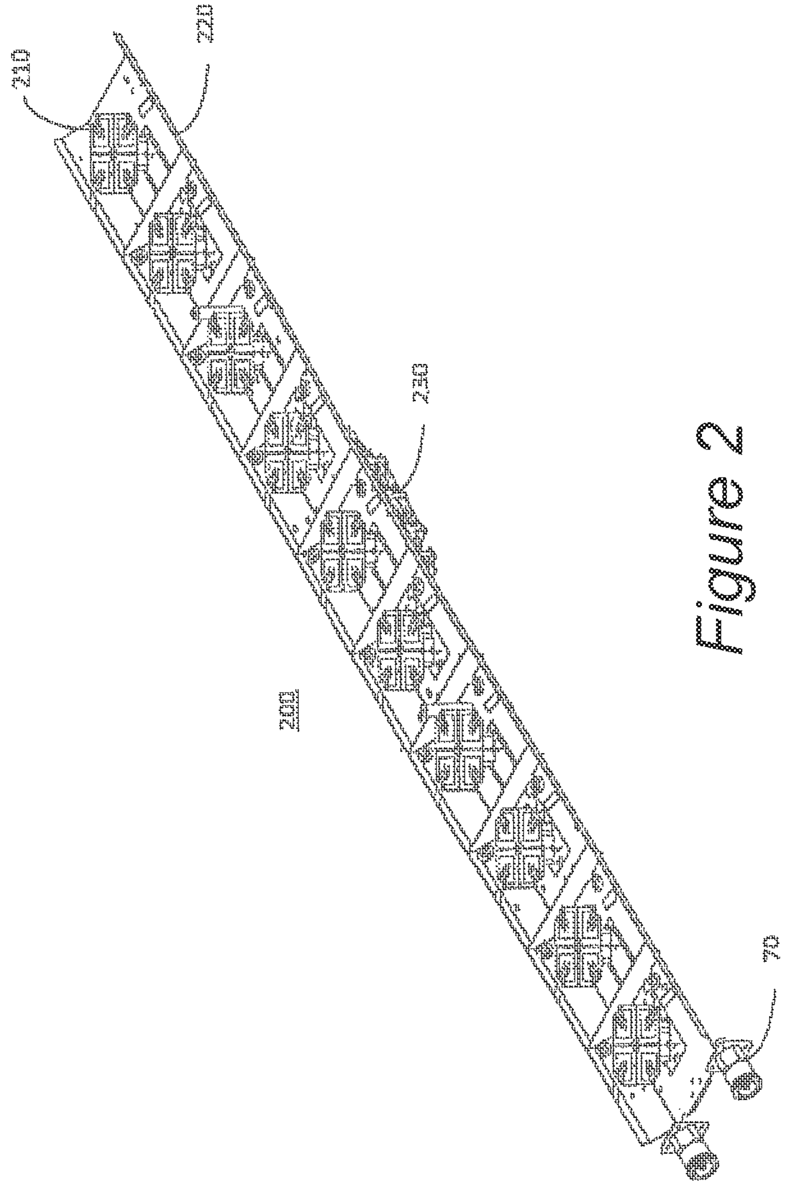
FIG. 2 is a diagram showing an exemplary linear array for use in a lensed multi-beam base station antenna system.
Figure 3A:
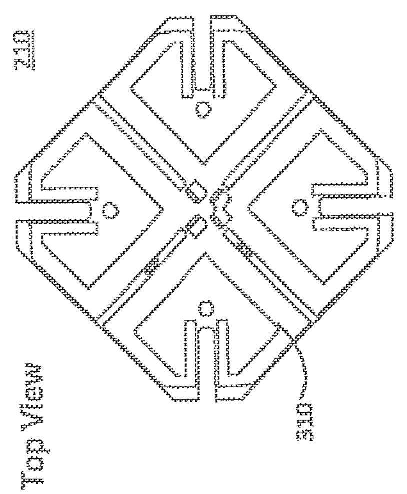
FIG. 3*a* is a diagram showing a top view of an exemplary box-style dual polarized antenna radiating element.
Figure 3B:
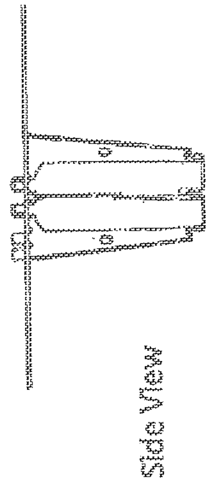
FIG. 3*b* is a diagram showing a side view of an exemplary box-style dual polarized antenna radiating element.
Figure 3C:
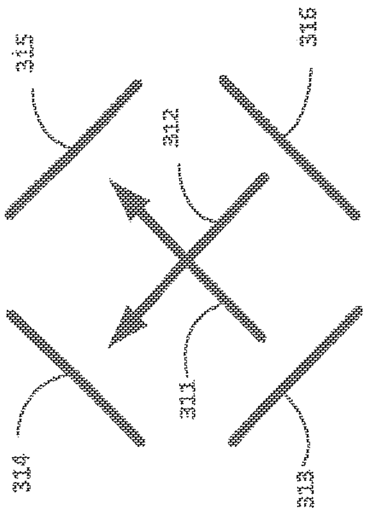
FIG. 3*c* is a diagram of equivalent dipoles of an exemplary box-style dual polarized antenna radiating element.

Referring to FIG. 2, an exemplary linear antenna array 200 for use in a multi-beam base station antenna system 10 is shown in more detail. The array 200 includes a plurality of radiating elements 210, reflector 220, phase shifter/divider 230, and two input connectors 70. The phase shifter/divider 230 may be used for beam scanning (beam tilting) in the elevation plane. Each radiating element 210 includes two linear orthogonal polarization (slant+1-45° 311, 312), as shown in more detail in FIG. 3*c*, where 4 equivalent dipoles 313-316 are shown forming two orthogonal polarization vectors 311, 312. Four dipoles 310 are arranged in a square, or in the "box", as shown in FIG. 3*a* and supported by feed stalks, as illustrated in FIG. 3*b*. The configuration of radiating element 210 and reflector 220 provide a special shape of antenna pattern in the azimuth plane with a close to linear dependence of Azimuth beamwidth with frequency. For example, for a three beam antenna shown in FIG. 1, measured −3 dB beamwidth of radiating element 210 is plotted against frequency in FIG. 4 (plot 410) and vary from 62° (1.7 GHz) to 46° (2.7 GHz). As a result of lens 30, the azimuth beamwidth of the total antenna is stabilized in the frequency band (see plots 430 for 3 dB beamwidth and 420 for −10 dB beamwidth). As one can see from plot 420, −10 dB beamwidth is very close to desirable 40°: 40+/−3° was measured over 45% bandwidth). Beam width and beam position stabilization is important for multi-beam antennas to provide appropriate cell coverage. If a radiating element without this specific frequency dependence is used, beam variations of total antenna will be too much, i.e., −10 dB beamwidth may vary from 30° to 50° as a function of frequency, and illumination of assigned sector will be very poor. For example, these may be big gaps (up to 30 dB at the highest frequency) between sectors (drop signal) or big overlapping between sectors at lower frequency, which is also not acceptable because of interference.

The effect of azimuth beam stabilization over frequency can be explained by FIG. 1*b*, where azimuth beamwidth of is written $\varphi$ for antenna arrays 20 and $\Theta$ for lens 30. The radio frequency lens is providing a focusing effect, so $\varphi>\Theta$. $\Theta$ is in inverse proportion to frequency f and also in inverse proportion to illuminated lens aperture S: $\Theta$=k1/fS, where k1 coefficient depends on amplitude and phase distribution (see J. D. Kraus, Antennas, McGraw-Hill, 1988, p. 846), and S=R 2 sin($\varphi$/2)

For beam stabilization, the condition $\Theta$(f1)=$\Theta$(f2) should be satisfied, or: sin [($\varphi$(f1)/2]/sin [($\varphi$(f2)/2]=f2/f1 (1)

As one can see from equation (1), for lensed antenna 10 beam stabilization, linear antennas 20*a*, 20*b*, 20*c* should have azimuth beam width monotonically decreasing with frequency. For small $\varphi$, $\varphi$(f1)/($\varphi$(f2)$\propto$f2/f1, i.e., azimuth beamwidth of antenna element 210 is in inverse proportion to frequency. This simplified analysis illustrates the importance of the frequency dependence of azimuth beam width of linear antennas 20. For example, to get maximum gain for lowest frequency, the entire focus area of should be used, or S=D, where D is diameter of lens. It means that for optimal wideband/ultra-wideband performance, a full lens should be illuminated for lowest frequency of bandwidth, and central area for highest frequency.

Figure 4:
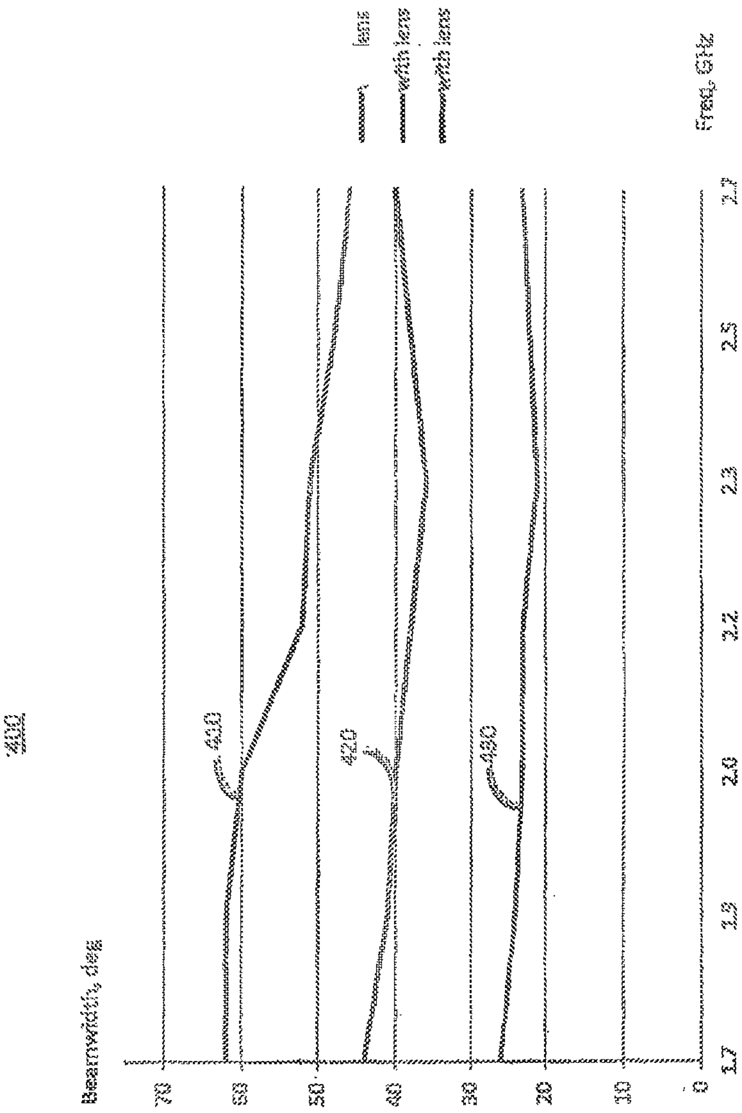
FIG. 4 is a diagram showing measured plots of antenna azimuth beamwidth against frequency for an exemplary assembled lensed multi-beam base station antenna system.

Another example using a "box" or square radiating element is shown in U.S. Pat. No. 6,333,720, which is hereby incorporated by reference in its entirety. An array of Box-type four dipole radiating elements has monotonically decreasing beamwidth with frequency because array factor is linearly reverse to frequency. When a box style radiating element is used without a lens, the array factor primarily contributes to its achieving significant frequency dependence (see plot 410 in FIG. 4). As shown in FIG. 4, with proper selection of antenna element (4 dipoles arranged in square or box element), the Azimuth beamwidth of the lensed antennas can be stabilized (plots 420, 430).

Figure 6:
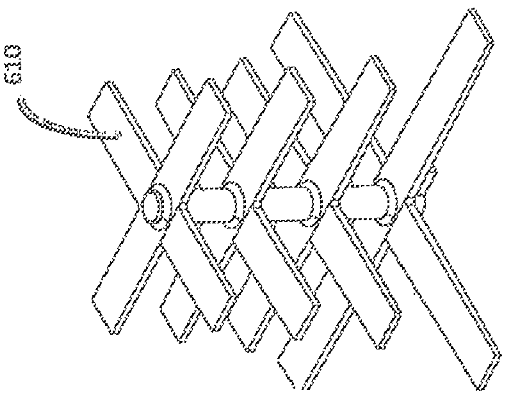
FIG. 6 is a diagram showing an exemplary system of crossed directors for use in a lensed multi-beam base station antenna system.

Furthermore, linear antenna array can have "box" elements of different frequency bands, interleaved with each other as shown in U.S. Pat. No. 7,405,710 (which is incorporated by reference), where first box-type dipole assembly is coaxially disposed within a second box-type dipole assembly and located in one line. This allows a lensed antenna to operate in two frequency bands (for example, 0.79-0.96 and 1.7-2.7 GHz). For similar beam widths of lensed antenna in both bands, central box-type element (high band element) should have directors (FIG. 6). In this case, a low band element may have, for example, a HPBW of 65-50°, and a high band element may have a HPBW of 45-35°, and in the result, the lensed antenna will have stable HPBW of about 23° (and beam width about 40° by −10 dB level) across both bands.

Figure 5A:
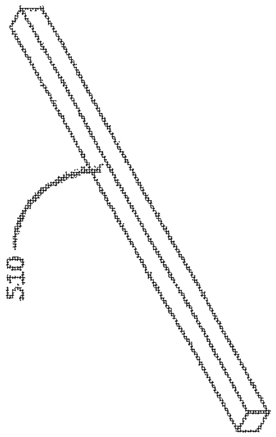
FIG. 5*a* is a diagram showing a first example of a secondary lens for use in a lensed multiple beam base station antenna system for azimuth beam stabilization.
Figure 5B:
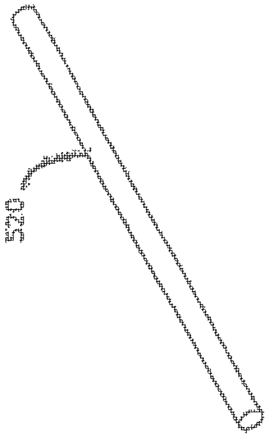
FIG. 5*b* is a diagram showing a second example of a secondary lens for use in a lensed multiple beam base station antenna system for azimuth beam stabilization.
Figure 5C:
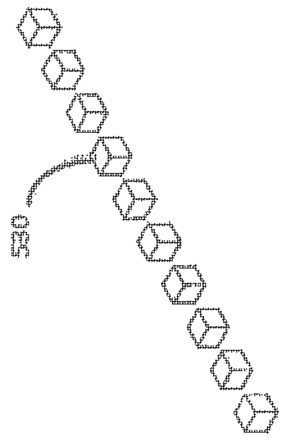
FIG. 5*c* is a diagram showing a third example of a secondary lens for use in a lensed multiple beam base station antenna system for azimuth beam stabilization.

The multi-beam base station antenna system may include one or more secondary lenses. These secondary lenses 43 can be placed between array 20*a*, 20*b*, and 20*c* and lens 30 for further azimuth beamwidth stabilization, as shown in FIG. 1B. The secondary lenses may comprise dielectric objects, such as rods 510 and 520 or cubes 530 as shown in FIGS. 5*a*-5*c*, respectively. Other shapes may also be used.

As shown in FIG. 6, directors 610 can be also placed on the top of radiators for further beamwidth stabilization in the wide frequency band. The directors 610 can vary in length, which can be selected, for example, so as to narrow the radiation pattern for the higher frequency band while leaving the radiation pattern in the lower portion of frequency band unchanged. This configuration can result in more a sharp dependence of azimuth pattern of the arrays 20*a*, 20*b*, and 20*c* against frequency.

By utilizing a combination of specially selected element 210 shapes, dielectric pieces/secondary lenses 510, 520, 530, and/or directors 610 above array elements 210, a stable pattern in the very wide frequency band can be provided (e.g. greater than 50%). For example, as shown in FIG. 4, a −10 dB beamwidth for a three-beam antenna 420 is 40+/−4° in 1.7-2.7 GHz band (40° is optimal for sector coverage). In prior art, this beamwidth can vary from 28-45°, which is not acceptable for cell sectors because too narrow beams can lead to drop signals in beam-crossing directions, and wide beams)(>45°) can lead to undesirable interference between sectors due to overlapping.

Figure 8:
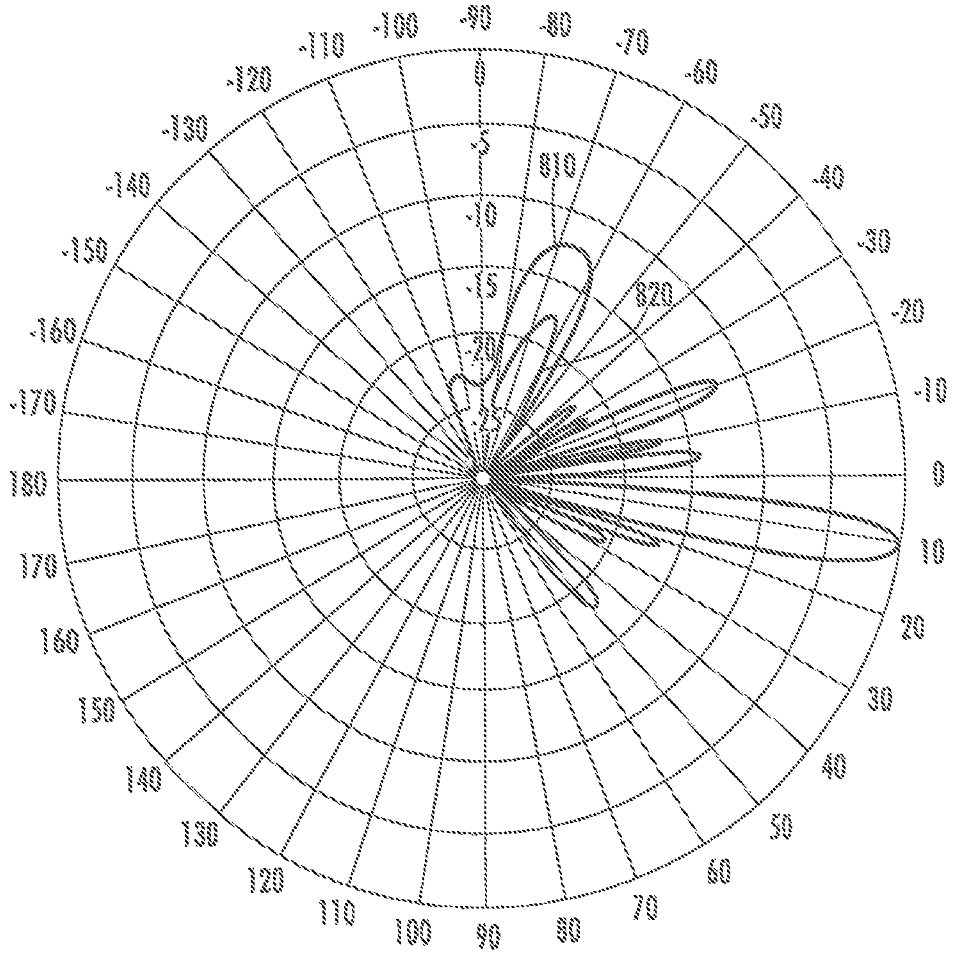
FIG. 8 is a diagram showing a measured elevation pattern for an exemplary multi-beam base station antenna system with and without a lens.

As shown in FIG. 8, the use of a cylindrical lens significantly reduces grating lobes (and other far sidelobes) in the elevation plane (compare plot 810 is for antenna without lens, and plot 820 for the same antenna with lens). Typically, 5 dB grating lobe reduction was observed for 3-beam antenna shown in FIG. 1. The 5 dB grating lobe reduction is correlated with 5 dB gain advantage of lensed antenna FIG. 1 against original linear arrays 20. The grating lobe's improvement is due to the lens focusing the main beam only and defocusing the far sidelobes. This allows increasing spacing between antenna elements. For prior art, the spacing between array elements depends on grating lobe and is selected by criterion: dmax/λ<1/(sin Θ0+1), where dmax is maximum allowed spacing, λ-wavelength and Θ0 is scan angle (see Eli Brookner, Practical Phased Array Antenna Systems, Artech House, 1991, p. 4-5). In lensed antenna, spacing dmax can be increased: dmax/=1.2˜1.3[1/(sin Θ0+1)]. So, the lens 30 allows the spacing between radiating elements 210 to be increased for the multi-beam base station antenna system 10 while reducing the number of radiating elements by 20-30% for comparable prior art systems. This results in additional cost advantages for the multi-beam base station antenna system 10.

Figure 7B:
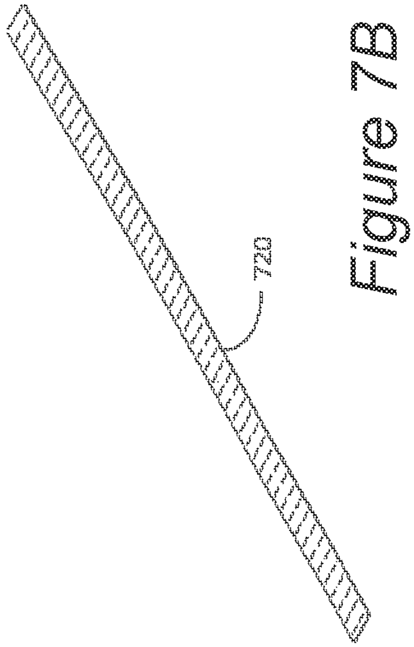
FIG. 7*b* is a diagram showing a second example of an antenna compensator for use in a lensed multi-beam base station antenna system.
Figure 7C:
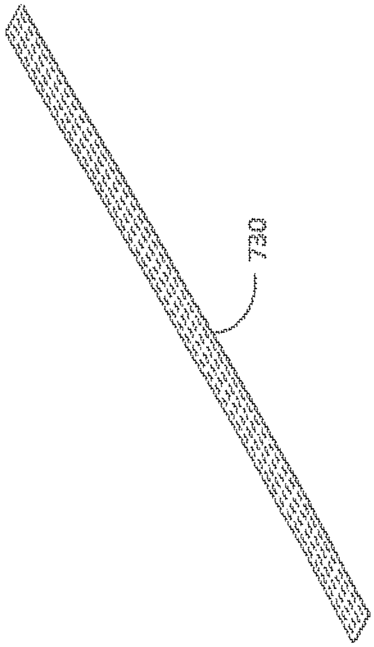
FIG. 7*c* is a diagram showing a third example of an antenna compensator for use in a lensed multi-beam base station antenna system.
Figure 7A:
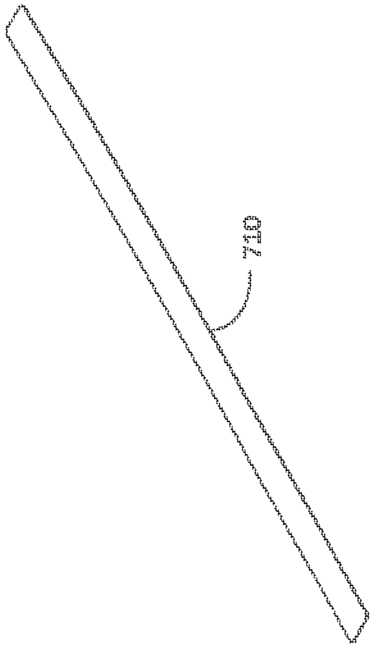
FIG. 7*a* is a diagram showing a first example of an antenna compensator for use in a lensed multi-beam base station antenna system.

As shown in FIG. 7*a*, compensators 40 and 42 are, in the simplest case, dielectric sheets 710 with certain dielectric constant and thickness. The Dk and thickness of the compensator 40 and 42 can be selected for wideband return loss tuning (>15 dB at ports 70) and providing desirable port-to-port isolation between all ports 70 (usually need >30 dB). Also, second compensator 42 may also compensate reflection from the outer boundary of lens 30, for further improvement of port-to-port isolation. Compensators 40 and 42 can have a variety of shapes, such as shapes 710, 720, 730, 740, 750, and 760 shown in FIGS. 7*a*-7*f*.

Figure 7D:
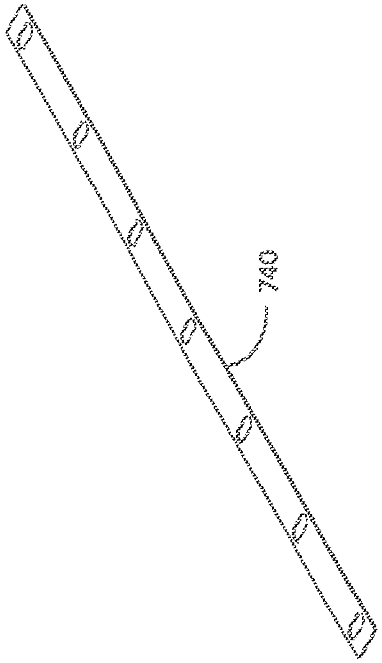
FIG. 7*d* is a diagram showing a fourth example of an antenna compensator for use in a lensed multi-beam base station antenna system.
Figure 7E:
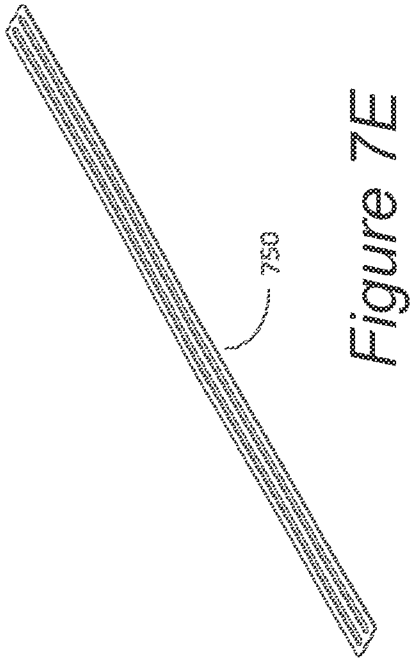
FIG. 7*e* is a diagram showing a fifth example of an antenna compensator for use in a lensed multi-beam base station antenna system.
Figure 7F:
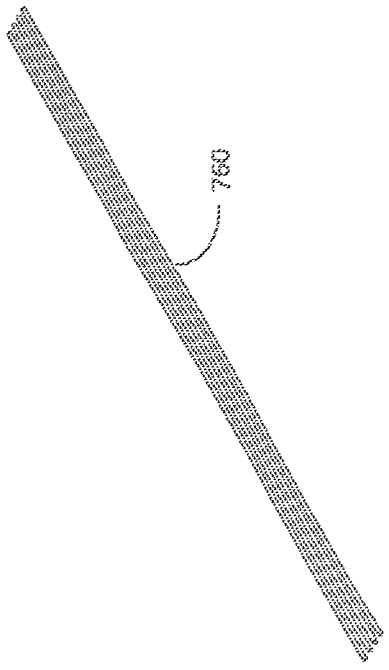
FIG. 7*f* is a diagram showing a sixth example of an antenna compensator for use in a lensed multi-beam base station antenna system.

Alternatively, or additionally, short conductive dipoles (with length<<λ) may also be used on the surface of compensators 40 and 42 to compensate depolarization of isotropic dielectric cylinder. When an EM wave crosses the dipole, maximum phase delay will occur when vector E is parallel to the dipoles and minimum when perpendicular. So, the process of depolarization can be controlled by placing different orientations of wires on compensators 40 and 42. For example, depolarization of linear polarization can be decreased (axial ratio >20 dB), or, if needed, can be converted to circular (axial ratio close to 0 dB). For example, compensators 720 and 730 includes short wires printed on a dielectric sheet, as shown in FIGS. 7*b* and 7*c*, respectively; compensator 720 has lateral wires, 730 has longitudinal wires. Referring to FIGS. 7*d* and 7*e*, similar functions for polarization tuning can be achieved with compensators 740. 750 having slots in the dielectric. In another example, compensator 760 comprises thin dielectric rods, as shown in FIG. 7*f*. So, compensators 42, 40 are used for return loss and port-to-port isolation improvements and (or) antenna polarization control. Alternatively, or additionally, wires may be disposed on the surface or lens 30 for providing similar benefits.

End caps 64*a* and 64*b*, radome 60, and tray 66 provide antenna protection. Radome 60 and tray 66 may be made as one extruded plastic piece. Other materials and manufacturing processes may also be used. In some embodiments, tray 66 is made from metal and acts as an additional reflector to improve antenna back lobes and front-to-back ratio. In some embodiments, an RF absorber (not shown) can be placed between tray 66 and arrays 20*a*, 20*b*, and 20*c* for additional back lobes' improvement. The lens 30 is spaced such that the apertures of the antennas arrays 20*a*, 20*b*, and 20*c* point at a center axis of the lens 30. Mounting brackets 53 are used for placing antenna on the tower.

Figure 9:
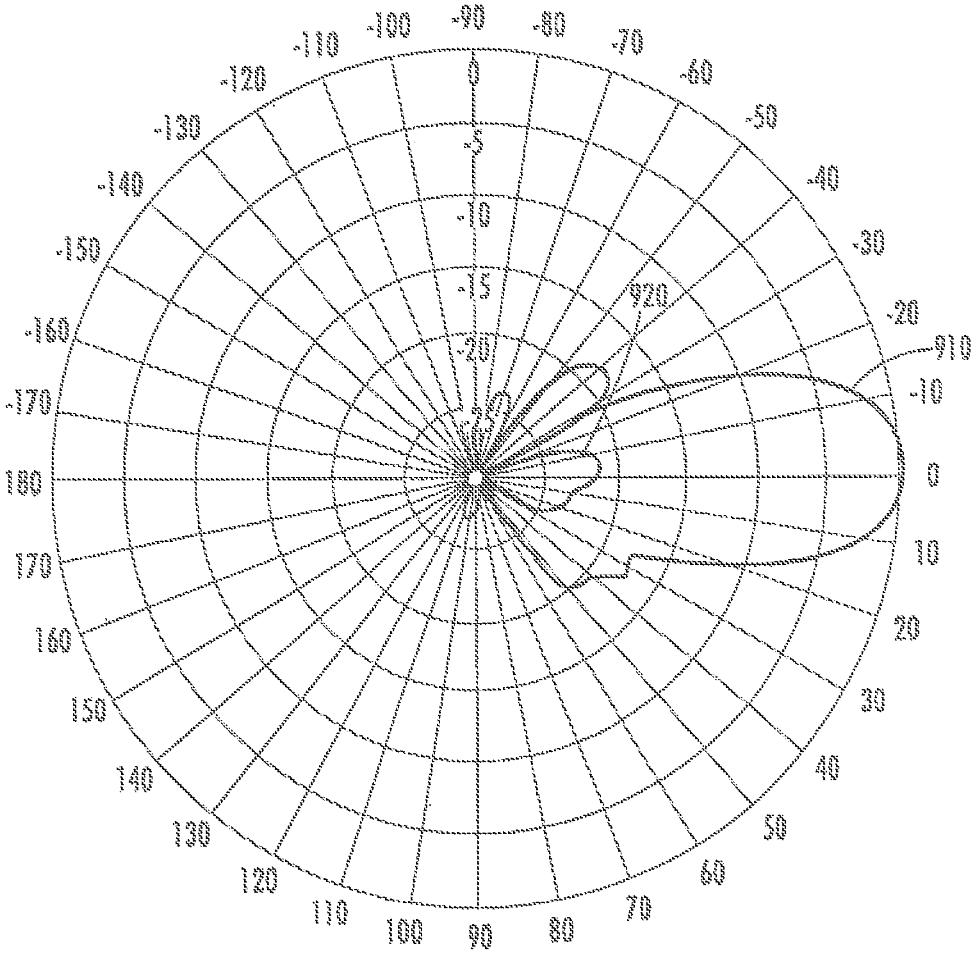
FIG. 9 is a diagram showing a measured azimuth co-polar and cross-polar radiation patterns for a central antenna beam of an exemplary three-beam lensed based station antenna system.

In FIG. 8, radiation patterns of the multi-beam base station antenna system 10 of FIG. 1 is shown, measured in elevation plane (plot 820) for beam tilt 10° and d/2=0.92. For comparison, a radiation pattern without a radio frequency lens 30 is shown (plot 810) which has 5 dB higher grating lobe. In FIGS. 9, 10 and 11, radiation patterns of the multi-beam base station antenna system 10 of FIG. 1 are shown, measured in azimuth plane. In FIG. 9, co-polar (910) and cross-polar (920) azimuth patterns are shown for central beam. As one can see from FIG. 9, good antenna performance is achieved, including low cross-polarization level (<−20 dB), low sidelobes (<−18 dB) and low back lobes. In contrast, prior art analogous antenna based on classical Luneberg has cross-polarization level 10-12 dB higher. In wireless communications, low cross-polarization of antenna benefits to diversity gain and MIMO performance, and reduction of side and back lobes reduce the interference. In FIG. 10, all three beams are shown together (1010, 1020, 1030). Please note that all three beams have the same shape, which is an advantage compared to prior art Butler matrix multi-beam solutions, where outer beams are not symmetrical and have different shape and gain compare to central beam. FIG. 11 illustrates a configuration of three multi-beam base station antenna systems of FIG. 1 providing uniform 360° cell coverage with low overlap between beams, which is desirable for LTE.

Figure 12:
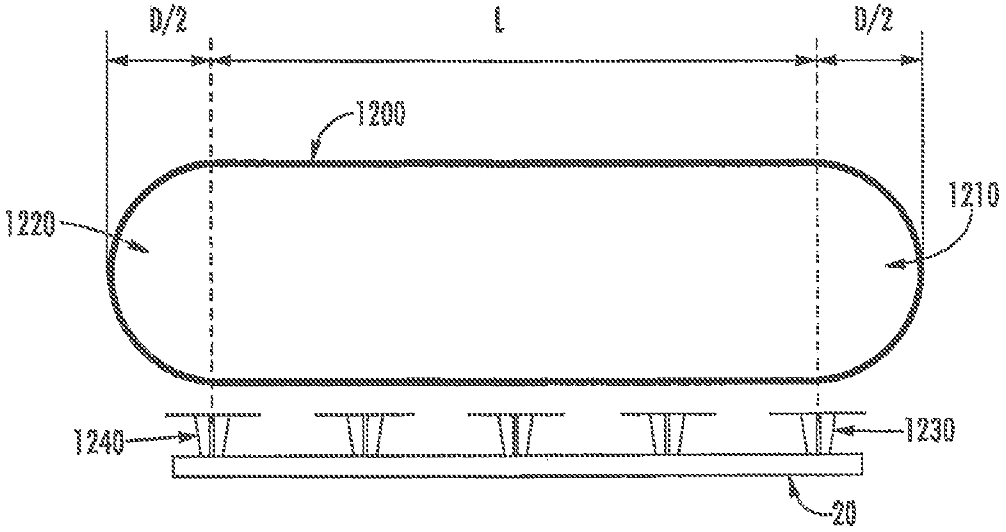
FIG. 12 is a diagram showing a side view of another exemplary lensed base station antenna with cylindrical lens having hemispherical ends.

In FIG. 1, radio frequency lens 30 has flat top and bottom areas, as it is convenient from mechanical/assembling point of view (simple flat end cups 64*a*, 64*b* can be used). But in some cases, as shown in FIG. 12, a radio frequency lens 1200 with rounded (hemispherical) ends 1210, 1220 may be used. For simplicity, only one linear array 20 is shown in FIG. 12, which can be analogous to linear array 20 presented in FIG. 2. Hemispherical lens ends 1210, 1220 provide additional focusing in elevation plane for edge radiating elements 1230, 1240 resulting in advantage of obtaining of additional gain $\Delta G \approx 10 \log(1+D/L)$, [dB], where D is lens diameter. For a three beam antenna as shown in FIG. 1, $\Delta G \approx 1$ db. Configuration of FIG. 12 can be an economically effective way for improving antenna gain, because the additional gain $\Delta G$ is obtained without increasing lengths of arrays 20 and number of their radiating elements.

In addition to single band antennas, the dual and/or multiband antennas are in demand. Such antennas may include, for example antennas providing ports for transmission and reception in the, 698-960 MHz+1.7-2.7 GHz bands, or, for example, 1.7-2.7 GHz+3.4-3.8 GHz. Use of cylindrical lenses gives good opportunity for creating dual-band multi-beam BSA. A homogeneous cylindrical radio frequency lens works well when its diameter D=1.5-6λ, (wavelength in free space). This is applicable for both BSA dual-band cases mentioned above. A challenge is providing the same the azimuth beamwidth for all bands and all beams. To get this, azimuth beam width of a low band antenna array (before passing through a radio frequency lens) should be wider compare to a high band antenna array, approximately in proportion of central frequency ratio between the two bands.

Figure 13:
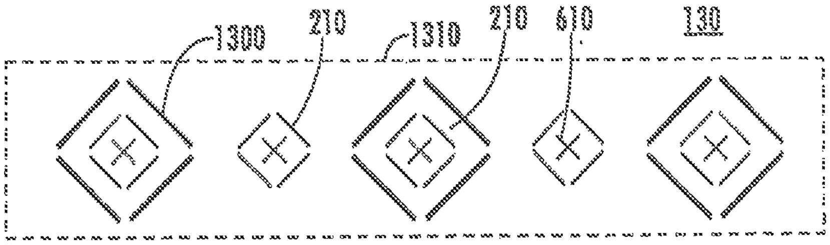
FIG. 13 is a diagram showing a column of radiating elements of two different frequency bands for use in a dual band lensed multi-beam base station antenna system.
Figure 14:
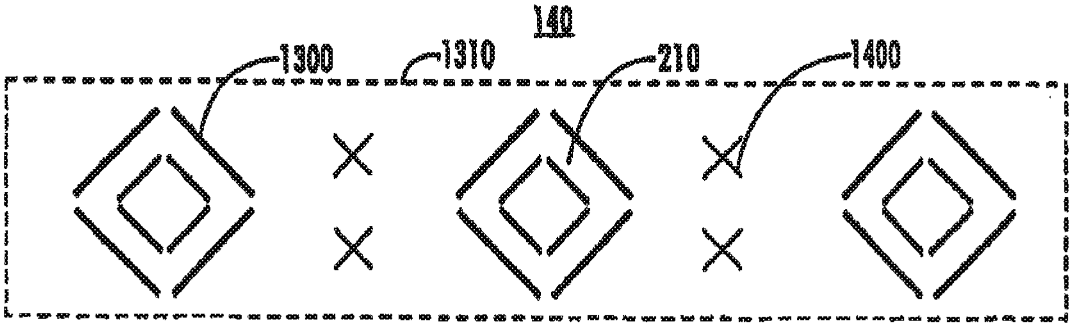
FIG. 14 is a diagram showing an another exemplary column of radiating elements of two different frequency bands for use in a dual-band lensed multi-beam base station antenna system.
Figure 15:
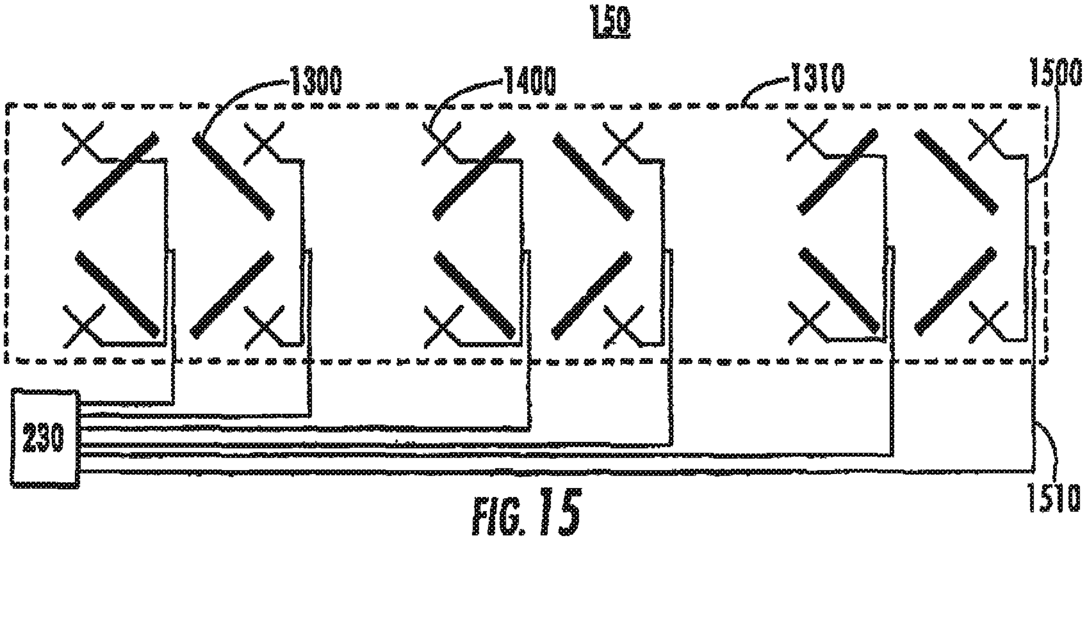
FIG. 15 is a diagram showing another exemplary column of radiating elements of two different frequency bands for use in a dual-band lensed multi-beam base station antenna system.

In FIG. 13-15, solutions for dual-band antenna arrays (which are part of multi-beam lensed antenna) are schematically shown. These dual band arrays contain radiators of 2 different bands and these arrays can be placed around lens in similar way as it is shown in FIG. 1 for single band arrays.

In FIG. 13, lower band (LB) radiating elements 1300 and higher band (HB) radiating elements 210 are placed in the same line in the center of reflector 1310. Both LB and HB radiating elements are box-type dipole array to provide azimuth beam width monotonically decreasing azimuth beam with increasing of frequency. Also, each HB element 210 has directors 610 which help HB azimuth beamwidth to be narrower, than LB azimuth beamwidth. In the result, after passing the radio frequency lens 30, LB and HB radiation patterns have similar beamwidth (as it was detailed discussed above). If, for example, for array 1310 LB azimuth HPBW is 65°-75°, HB can be about 40°, and the resulting HPBW of multi-beam lensed antenna is about 23° in both bands.

In FIG. 14, another dual band array is shown, with another approach for narrowing HB azimuth beam. Inside LB element 1300, single HB element 210 is placed, but between LB elements, a pair of HB elements 1400 are placed. These HB elements 1400 can be, for example, crossed dipoles, as shown in FIG. 14. By variation of spacing between elements 1400 in azimuth plane, azimuth HB beam can be adjusted to required width, so that beamwidth after passing through the radio frequency lens 30 is of a desired HPBW.

In FIG. 15, one more dual band array is shown. Pairs of HB elements 1400 are connected by 1:2 power divider 1500 and feedlines 1510 to phase shifter/divider 230. By variation of spacing between elements 1400 in azimuth plane, azimuth HB beam can be adjusted to required width, for optimal covering of cell sector.

While the foregoing examples are described with respect to three beam antennas, additional embodiments including, for example, 1-, 2-, 4-, 5, -6, N-beam antennas sharing a single lens are also contemplated. Additional configurations are also contemplated.

So, proposed multi-beam antenna solution, compared to known Luneberg lens and Butler matrix feed network solutions has reduced cost, has less weight, is more compact and has better RF performance, including inherently symmetrical beams and improved cross-polarization, port-to-port isolation, and beam stability.

Though the invention has been described with respect to specific preferred embodiments, many variations and modifications will become apparent to those skilled in the art upon reading the present application. For example, the invention can be applicable for radar multi-beam antennas. The invention is therefore that the apprehended claims be interpreted as broadly as possible in view of the prior art to include all such variations and modifications.

What is claimed is:

1. A multi-beam antenna system comprising:

a first array of radiating elements configured to radiate in a first frequency band to generate a first antenna beam;

a second array of radiating elements configured to radiate in a second frequency band to generate a second antenna beam;

a radio frequency ("RF") lens mounted forwardly of at least the first array of frequency band radiating elements;

a radome configured to house the first array of radiating elements, the second array of radiating elements, and the radio frequency lens, and wherein the first array of radiating elements and the second array of radiating elements are configured for a staggered arrangement.

2. A multi-beam antenna system comprising:

a first array of radiating elements configured to radiate in a first frequency band to generate a first antenna beam;

a second array of radiating elements configured to radiate in a second frequency band to generate a second antenna beam;

a radio frequency ("RF") lens mounted forwardly of at least the first array of frequency band radiating elements;

a radome configured to house the first array of radiating elements, the second array of radiating elements, and the radio frequency lens, and a third array of radiating elements configured to radiate in a third frequency band to generate a third antenna beam; and, wherein the third frequency band is different than the first frequency band.

3. A multi-beam antenna system comprising:

a first array of radiating elements configured to radiate in a first frequency band to generate a first antenna beam;

a second array of radiating elements configured to radiate in a second frequency band to generate a second antenna beam;

a radio frequency ("RF") lens mounted forwardly of at least the first array of frequency band radiating elements;

a radome configured to house the first array of radiating elements, the second array of radiating elements, and the radio frequency lens, and wherein each radiating element of the first array radiating elements is configured for dual polarization.

4. A multi-beam antenna system comprising:

a first array of radiating elements configured to radiate in a first frequency band to generate a first antenna beam;

a second array of radiating elements configured to radiate in a second frequency band to generate a second antenna beam;

a radio frequency ("RF") lens mounted forwardly of at least the first array of frequency band radiating elements;

a radome configured to house the first array of radiating elements, the second array of radiating elements, and the radio frequency lens, and wherein the RF lens is configured for a non-uniform dielectric constant.

5. The multi-beam antenna system of claim 4, wherein the RF lens comprises a plurality of dielectric particles.

6. The multi-beam antenna system of claim 5, wherein at least some of the dielectric particles contain left hand material.

7. The multi-beam antenna system of claim 4, wherein the RF lens is made from anisotropic material.

8. A multi-beam antenna system comprising:

a first array of radiating elements configured to radiate in a first frequency band to generate a first antenna beam;

a second array of radiating elements configured to radiate in a second frequency band to generate a second antenna beam;

a radio frequency ("RF") lens mounted forwardly of at least the first array of frequency band radiating elements;

a radome configured to house the first array of radiating elements, the second array of radiating elements, and the radio frequency lens, and wherein the RF lens is made from isotropic material.

9. A multi-beam antenna system comprising:

a first array of radiating elements configured to radiate in a first frequency band to generate a first antenna beam;

a second array of radiating elements configured to radiate in a second frequency band to generate a second antenna beam;

a radio frequency ("RF") lens mounted forwardly of at least the first array of frequency band radiating elements;

a radome configured to house the first array of radiating elements, the second array of radiating elements, and the radio frequency lens, and wherein the RF lens is made from a mixture of anisotropic and isotropic material.

10. The multi-beam antenna system of claim 9, wherein the RF lens has a dielectric constant between 1.5-2.3.

11. The multi-beam antenna system of claim 9, wherein the RF lens comprises a cylindrical lens.

12. A multi-beam antenna system comprising:

a first array of radiating elements configured to radiate in a first frequency band to generate a first antenna beam;

a second array of radiating elements configured to radiate in a second frequency band to generate a second antenna beam;

a radio frequency ("RF") lens mounted forwardly of at least the first array of frequency band radiating elements;

a radome configured to house the first array of radiating elements, the second array of radiating elements, and the radio frequency lens, and wherein the RF lens comprises a non-cylindrical lens.

13. The multi-beam antenna system of claim 12, further comprising:

wherein the first array of radiating elements has a first longitudinal axis and a first azimuth angle;

wherein the RF lens has a second longitudinal axis; and, wherein the first longitudinal axis is substantially aligned with the second longitudinal axis and the first azimuth angle.

14. The multi-beam antenna system of claim 13, further comprising:

wherein the second array of radiating elements has a third longitudinal axis and a second azimuth angle;

wherein the second longitudinal axis is substantially aligned with the first longitudinal axis and the second azimuth angle.

15. The multi-beam antenna system of claim 12, wherein at least the first array of radiating elements are mounted to extend forwardly from a reflector.

16. The multi-beam antenna system of claim 12, wherein the first array of radiating elements is arranged in a first column, and wherein the second array of radiating elements is arranged in a second column.

17. The multi-beam antenna system of claim 16, wherein the first column is different than the second column.

18. The multi-beam antenna system of claim 12, wherein the first frequency band is different than the second frequency band.

19. The multi-beam antenna system of claim 12, wherein the RF lens is constructed from a polymer structure.

20. The multi-beam antenna system of claim 12, wherein the RF lens comprises a non-homogeneous material.

21. The multi-beam antenna system of claim 12, wherein the RF lens comprises a homogeneous material.

22. The multi-beam antenna system of claim 12, wherein the RF lens is configured for a substantially uniform dielectric constant.

23. The multi-beam antenna system of claim 12, wherein the RF lens comprises at least a first dielectric material, and a second dielectric material.

24. The multi-beam antenna system of claim 23, wherein the first dielectric material has a first anisotropy, and the second dielectric material has a second anisotropy, where the two types of dielectric material have different anisotropy.

25. The multi-beam antenna system of claim 24, wherein the first anisotropy is different than the second anisotropy.

26. The multi-beam antenna system of claim 23, wherein the first dielectric material is different from the second dielectric material.

27. The multi-beam antenna system of claim 23, where the first dielectric material and the second dielectric material are mixed in unequal proportions.

28. The multi-beam antenna system of claim 23, where the first dielectric material has a first dielectric constant in a first direction, and the second dielectric material has a second dielectric constant in the first direction.

29. The multi-beam antenna system of claim 12, further comprising a dielectric sheet disposed between the RF lens and at least the first array of radiating elements.

30. The multi-beam antenna system of claim 29, further comprising a wire disposed on the dielectric sheet.

31. The multi-beam antenna system of claim 29, wherein the dielectric sheet includes a plurality of slots.

32. The multi-beam antenna system of claim 12, further comprising a secondary RF Lens disposed between the RF lens, and at least the first array of radiating elements.

33. A multi-beam antenna system comprising:

a first array of radiating elements configured to radiate in a first frequency band to generate a first antenna beam;

a second array of radiating elements configured to radiate in a second frequency band to generate a second antenna beam;

a radio frequency ("RF") lens mounted forwardly of at least the first array of frequency band radiating elements;

a radome configured to house the first array of radiating elements, the second array of radiating elements, and the radio frequency lens, wherein the first frequency band is configured to produce a first wavelength; and wherein the RF lens has a diameter of approximately 1.5-5 first wavelengths.

34. A multi-beam antenna system comprising:

a first array of radiating elements configured to radiate in a first frequency band to generate a first antenna beam;

a second array of radiating elements configured to radiate in a second frequency band to generate a second antenna beam;

a radio frequency ("RF") lens mounted forwardly of at least the first array of frequency band radiating elements;

a radome configured to house the first array of radiating elements, the second array of radiating elements, and the radio frequency lens, and wherein the RF lens comprises at least a first block of artificial dielectric material.

35. The multi-beam antenna system of claim 34, wherein the first block of artificial dielectric material further comprises conductive fibers.

36. The multi-beam antenna system of claim 34, wherein the first block of artificial dielectric material further comprises conductive patches.

37. The multi-beam antenna system of claim 34, wherein the first block of artificial dielectric material further comprises conductive tubes.

38. The multi-beam antenna system of claim 34, wherein the first block of artificial dielectric material further comprises a plurality of dielectric sheets embedded with a plurality of conductive tubes.

39. The multi-beam antenna system of claim 34, wherein the first block of artificial dielectric material further comprises dielectric tubes.

* * * * *